(No Model.) 2 Sheets—Sheet 1.
J. RAGOUCY.
VELOCIPEDE FRAME.
No. 511,359. Patented Dec. 26, 1893.
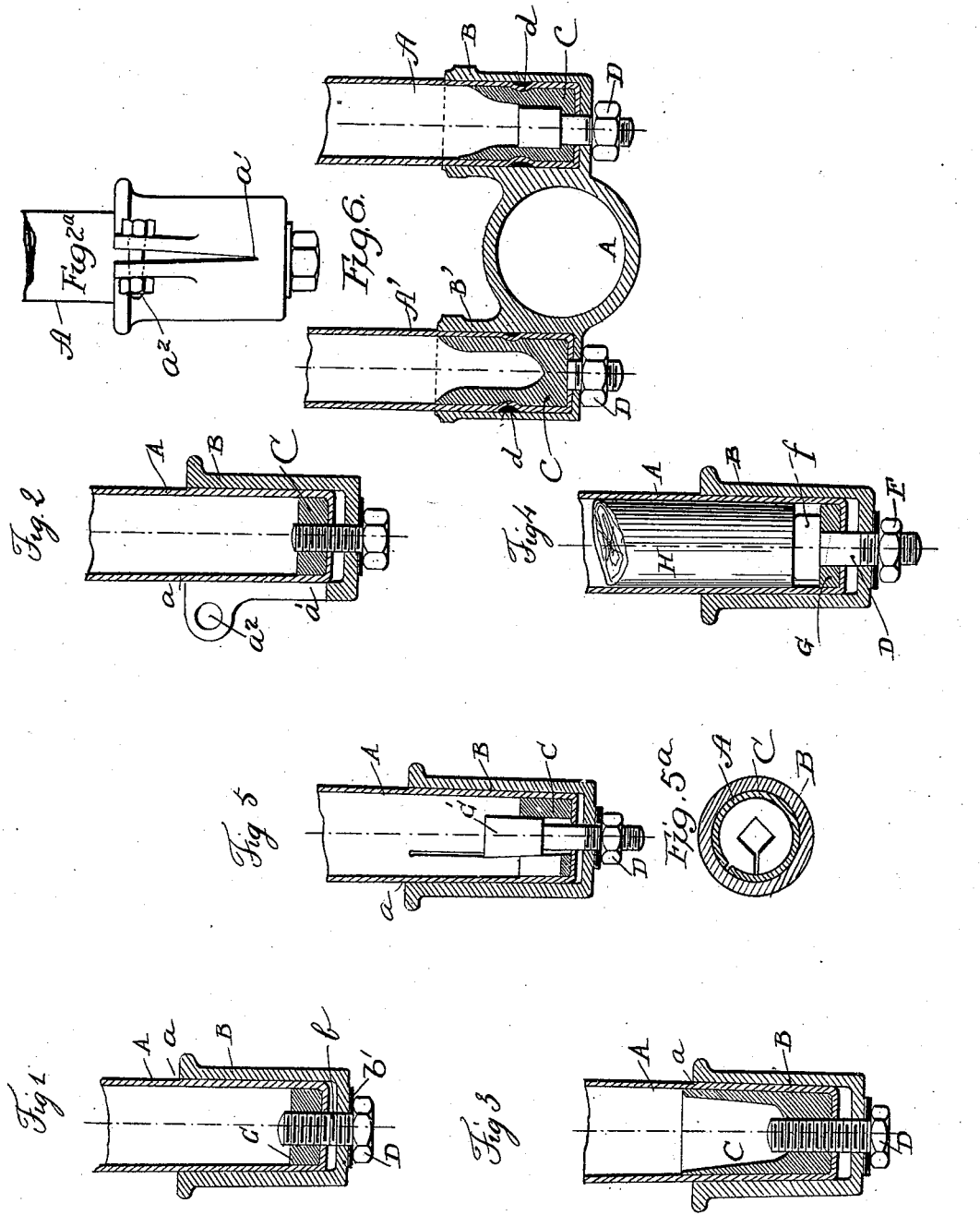
Witnesses:
Inventor:
Joachim Ragoucy
By Richards & Co
his Attorneys

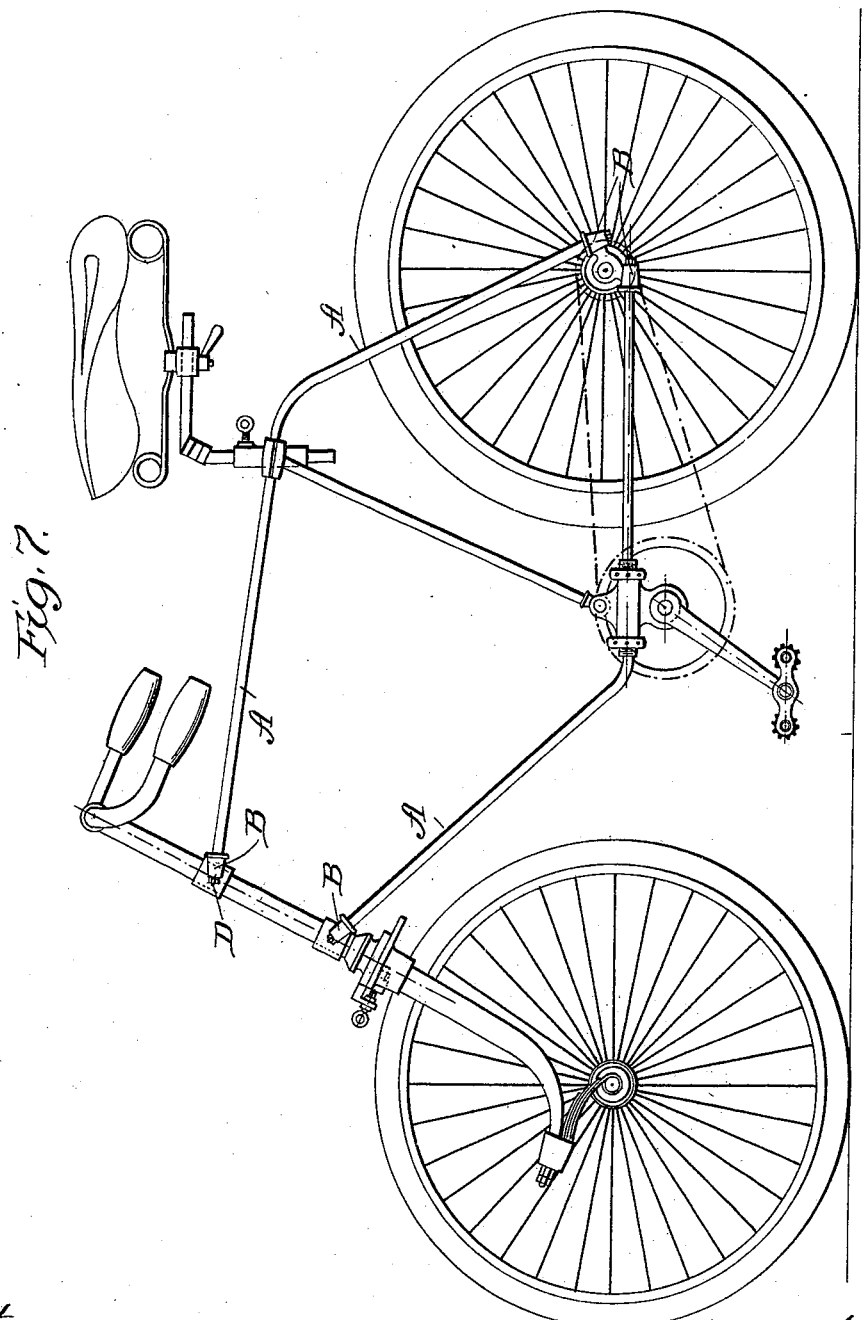

UNITED STATES PATENT OFFICE.

JOACHIM RAGOUCY, OF PARIS, FRANCE.

VELOCIPEDE-FRAME.

SPECIFICATION forming part of Letters Patent No. 511,359, dated December 26, 1893.

Application filed December 20, 1892. Serial No. 455,859. (No model.)

*To all whom it may concern:*

Be it known that I, JOACHIM RAGOUCY, a citizen of the French Republic, residing at Paris, France, have invented certain new and useful Improvements in Velocipede-Frames, of which the following is a specification.

My invention relates to velocipedes and particularly to the frames thereof formed of tubular parts.

The object of my invention is to provide a frame which will be light, strong and particularly durable as to its joints, and the invention therefore consists particularly in the means for fastening the tubes comprising the frame to each other and to other portions of the frame.

In the accompanying drawings:—Figure 1, is a sectional view of a portion of a tube composing the frame and the means for securing the same within the tube socket. Figs. 2, 3, 4 and 5 are similar views of modified forms. Fig. $2^a$ is a side elevation of Fig. 2. Fig. $5^a$ is a sectional plan of Fig. 5. Fig. 6 is a sectional plan view of the front ends of two tubes of the frame and the means for coupling the same to the front fork of the machine. Fig. 7, is a side view of a bicycle having my improvements.

In the drawings A, represents the steel tube composing the frame. It is cylindrical in form up to the point $a$; from here it tapers slightly to its end, which is closed as shown excepting at its center where an axial opening is left to receive the screw or bolt D, to hold the tube within the socket B, corresponding in form to the tapered end of the tube. In Fig. 1, the screw passes axially through the end of the socket and tube and its inner end engages a threaded nut or cylinder C, arranged within the end of the tube, the outer end of the screw having an ordinary head. The parts are so fitted that the screw will draw the end of the tube into the tapered socket leaving a slight space $b$, however, for adjustment. A pin $b'$, is preferably thrust through the screw near the head thereof.

In Fig. 2, the tube socket is shown as split to the point $a'$ and a clamp screw is used at $a^2$, to hold the socket more or less tightly to the end of the tube. The setting or nut C, in this form may be angular instead of round as in Fig. 1.

Fig. 3, shows a modified form of the threaded cylinder or nut within the tube A, this being in the form of a ring and having an opening threaded to receive the screw.

In Fig. 4, the tension is applied and the parts drawn into place by the bolt D, having an interior head $f$, bearing on the inner side of the cylinder or nut G, having a plain central opening for the passage of the bolt which is threaded on its outer end to receive the nut F. In order to strengthen the coupling joint the filling H, is forced into the end of the tube and this may consist of wood.

In Fig. 5, the bolt is shown as provided with a wedge shaped or conical head G', adapted to spread apart the split portions of the cylinder C, and the split end of the tube to bear firmly against the interior of the socket. The pins $b'$, before mentioned may be used with each of the forms above described.

Fig. 6, represents the invention as used for connecting the tubular frame with the front fork. The said fork carries two laterally arranged sockets B, B', and in these the tubes A, A', are fastened. These tubes have the cylinders or rings C, similar to those before described, drawn to place and held by the bolts projecting axially from the ends of the tubes and sockets. The cylinders have annular grooves into which fit the swaged ribs $d$, of the ends of the tubes in order to make a firm connection. The channel thus left about the swaged portion of the tube is filled with any suitable metallic wire or other filling to prevent the ribs from being drawn out of shape under the strain. While I have shown the filling only in connection with Fig. 4, it is of course intended to be used with any of the forms shown.

I claim as my invention—

1. In combination the tubular rod having its shell extending transversely at its end to close the same, the rings in said end, retained by the transverse shell the sockets and the holding bolt, substantially as described.

2. In combination, the socket the tubular rod having a split end, the split ring within said end and the holding bolt extending through the socket and engaging the split ring, said bolt having a head adapted to spread the split ring substantially as described.

In witness whereof I have hereunto set my hand in presence of two witnesses.

JOACHIM RAGOUCY.

Witnesses:
J. HAURE,
MONTUS CLAP.